US011325539B2

(12) United States Patent
Sagen et al.

(10) Patent No.: US 11,325,539 B2
(45) Date of Patent: May 10, 2022

(54) FISHING GEAR CARRIER BOX

(71) Applicant: Yakima Products, Inc., Lake Oswego, OR (US)

(72) Inventors: Jason Attfield Sagen, Portland, OR (US); Scott A. McFadden, Portland, OR (US); Gian-Marco D'Angelo, Portland, OR (US); Kirk William Turner, Tigard, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 64 days.

(21) Appl. No.: 16/812,228

(22) Filed: Mar. 6, 2020

(65) Prior Publication Data

US 2020/0282917 A1    Sep. 10, 2020

Related U.S. Application Data

(60) Provisional application No. 62/816,014, filed on Mar. 8, 2019.

(51) Int. Cl.
*B60R 9/055* (2006.01)
*A01K 97/08* (2006.01)
*B60R 9/08* (2006.01)

(52) U.S. Cl.
CPC ............ *B60R 9/055* (2013.01); *A01K 97/08* (2013.01); *B60R 9/08* (2013.01)

(58) Field of Classification Search
CPC .. B60R 9/055; B60R 9/08; B60R 9/12; B60R 7/14; B60R 9/048; B60R 9/058; A01K 97/08; A01K 97/10
See application file for complete search history.

(56) References Cited

U.S. PATENT DOCUMENTS

| 1,313,687 | A | | 8/1919 | Hellweg |
| D65,344 | S | | 7/1924 | Kubler |
| 2,483,947 | A | | 10/1949 | Turner |
| 2,536,797 | A | * | 1/1951 | Cooke ...................... B60R 9/08 224/568 |
| 3,008,177 | A | | 11/1961 | Wooten, Jr. |

(Continued)

FOREIGN PATENT DOCUMENTS

| DE | 2804588 A1 | 8/1979 |
| DE | 3837209 C1 | 3/1990 |

(Continued)

OTHER PUBLICATIONS

The International Bureau of WIPO, International Search Report and Written Opinion of the International Searching Authority in PCT Application No. PCT/US04/02436, dated Dec. 13, 2004, 7 pages.

(Continued)

*Primary Examiner* — Brian D Nash
(74) *Attorney, Agent, or Firm* — Kolisch Hartwell, P.C.

(57) ABSTRACT

A cargo box for securely carrying fishing rods and related cargo on top of a vehicle is disclosed, including a top portion hingedly connected to a bottom portion. The bottom portion includes plurality of rod holder assemblies to support and securely hold plurality of fishing rods and reels during transport between locations. The rod holder assemblies are configured to be repositionable to accommodate various lengths of fishing rods.

20 Claims, 8 Drawing Sheets

(56) References Cited

U.S. PATENT DOCUMENTS

| | | | |
|---|---|---|---|
| 3,348,747 A * | 10/1967 | Vuarchex | B60R 9/058 224/315 |
| 3,366,295 A | 1/1968 | Nygaard | |
| 3,677,196 A | 7/1972 | Schuller | |
| 3,817,470 A | 6/1974 | Calhoun | |
| 3,837,209 A | 9/1974 | Guse | |
| 4,217,999 A | 8/1980 | Forsman | |
| 4,249,684 A | 2/1981 | Miller et al. | |
| 4,274,568 A | 6/1981 | Bott | |
| 4,378,898 A | 4/1983 | Smeenge et al. | |
| 4,406,387 A | 9/1983 | Rasor | |
| 4,420,105 A | 12/1983 | Nepper | |
| 4,572,416 A * | 2/1986 | Upham | B60R 9/08 224/326 |
| 4,681,247 A * | 7/1987 | Prosen | B60R 9/00 224/322 |
| 5,181,639 A | 1/1993 | Kvanna | |
| 5,280,848 A | 1/1994 | Moore | |
| 5,419,479 A | 5/1995 | Evels et al. | |
| 5,492,258 A | 2/1996 | Brunner | |
| 5,546,705 A | 8/1996 | Hirtsiefer | |
| 5,556,221 A | 9/1996 | Brunner | |
| 5,582,313 A | 12/1996 | Envall | |
| 5,582,316 A | 12/1996 | Masayoshi et al. | |
| 5,762,244 A | 6/1998 | Wagner et al. | |
| 5,823,411 A | 10/1998 | Gronwoldt et al. | |
| 5,827,036 A * | 10/1998 | Steffes | A61G 3/0209 414/462 |
| 5,845,828 A | 12/1998 | Settelmayer | |
| 5,924,614 A | 7/1999 | Kuntze et al. | |
| 5,947,356 A | 9/1999 | Delong | |
| 6,112,964 A | 9/2000 | Cucheran et al. | |
| 6,145,719 A | 11/2000 | Robert | |
| 6,273,311 B1 | 8/2001 | Pedrini | |
| 6,296,161 B1 | 10/2001 | Van der Feen et al. | |
| 6,296,278 B1 | 10/2001 | Zupancic et al. | |
| 6,463,627 B1 | 10/2002 | Hirtsiefer | |
| 6,681,971 B2 | 1/2004 | Laverack et al. | |
| 6,766,929 B2 | 7/2004 | Karlsson | |
| 6,779,696 B2 | 8/2004 | Aftanas et al. | |
| 6,789,357 B1 | 9/2004 | McCullough | |
| 6,843,394 B2 | 1/2005 | Aki | |
| 6,918,521 B2 | 7/2005 | Settelmayer et al. | |
| 7,044,345 B2 | 5/2006 | Aftanas | |
| 7,175,377 B2 * | 2/2007 | Womack | B60P 7/0815 410/104 |
| 7,198,184 B2 | 4/2007 | Aftanas et al. | |
| 7,416,098 B2 | 8/2008 | Settelmayer et al. | |
| 7,441,679 B1 | 10/2008 | Harberts et al. | |
| 7,503,470 B2 | 3/2009 | Settelmayer et al. | |
| 7,637,405 B2 | 12/2009 | Emmerling et al. | |
| 7,802,707 B2 | 9/2010 | Afanas | |
| 7,806,306 B2 | 10/2010 | Afanas | |
| 8,074,851 B2 | 12/2011 | Settelmayer et al. | |
| 8,757,457 B2 | 6/2014 | Settelmayer et al. | |
| 2002/0030074 A1 | 3/2002 | Bove et al. | |
| 2003/0066852 A1 | 4/2003 | Aftanas et al. | |
| 2004/0155081 A1 * | 8/2004 | Settelmayer | B60R 9/055 224/319 |
| 2004/0256427 A1 * | 12/2004 | Settelmayer | B60R 9/055 224/319 |
| 2005/0145639 A1 | 7/2005 | Viklund et al. | |
| 2005/0274756 A1 | 12/2005 | Seys | |
| 2006/0032878 A1 | 2/2006 | Settelmayer et al. | |
| 2006/0237501 A1 * | 10/2006 | Gonzalez | A01K 97/08 224/325 |
| 2008/0017679 A1 * | 1/2008 | Leblanc | B60R 9/055 224/328 |
| 2008/0110948 A1 * | 5/2008 | Sutter | B60R 7/14 224/282 |
| 2010/0084447 A1 * | 4/2010 | Elliott | B60R 9/055 224/319 |
| 2011/0186608 A1 * | 8/2011 | Sautter | B60R 9/055 224/328 |
| 2012/0037579 A1 * | 2/2012 | Muldoon | A01K 97/08 211/64 |
| 2012/0228349 A1 * | 9/2012 | Sautter | B60R 9/055 224/328 |
| 2013/0264366 A1 * | 10/2013 | Hubbard | B60R 9/055 224/328 |
| 2014/0158727 A1 * | 6/2014 | Sautter | B60R 9/055 224/315 |
| 2018/0265013 A1 * | 9/2018 | Beznes | A01K 97/10 |
| 2019/0161022 A1 * | 5/2019 | McFadden | B60R 9/10 |
| 2019/0223424 A1 * | 7/2019 | Moses | B63B 25/002 |
| 2020/0085027 A1 * | 3/2020 | Crawford | A01K 97/10 |

FOREIGN PATENT DOCUMENTS

| | | |
|---|---|---|
| DE | 3817470 O2 | 3/1994 |
| DE | 4340019 C1 | 4/1995 |
| DE | 19526477 C1 | 9/1996 |
| DE | 19742253 C1 | 5/1999 |
| EP | 0422678 B1 | 7/1994 |
| EP | 0754595 A2 | 1/1997 |
| EP | 0983903 A1 | 3/2000 |
| EP | 1231112 A2 | 8/2002 |
| EP | 1284218 A1 | 2/2003 |
| EP | 1190906 B1 | 2/2005 |
| FR | 2849571 A1 | 12/2003 |
| JP | 7172452 A | 7/1995 |
| JP | 8183396 A | 7/1996 |
| JP | 8258630 A | 10/1996 |
| JP | 11291832 A | 10/1999 |
| SU | 1770175 A1 | 10/1992 |
| WO | 9711865 A1 | 4/1997 |
| WO | 2004067326 A2 | 8/2004 |

OTHER PUBLICATIONS

The International Bureau of WIPO, International Preliminary Report on Patentability in PCT Application No. PCT/US04/02436, dated Jan. 11, 2005, 5 pages.

European Patent Office, Office action in European Patent Application No. 04706064.5, dated Jul. 26, 2012, 8 pages.

* cited by examiner

US 11,325,539 B2

FISHING GEAR CARRIER BOX

CROSS-REFERENCES

This application claims the benefit under 35 U.S.C. § 119(e) of the priority of U.S. Provisional Patent Application Ser. No. 62/816,014, filed Mar. 8, 2019, the entirety of which is hereby incorporated by reference for all purposes.

The following related patent is also incorporated by reference, in its entirety, for all purposes: U.S. Pat. No. 7,416,098.

FIELD

This disclosure generally relates to containers for carrying cargo on a vehicle. Specifically, it relates to a cargo box for carrying fishing rods and related gear on top of a vehicle.

INTRODUCTION

Fishing rods and related gear may be difficult to fit inside vehicles. It may also be undesirable to carry fishing gear, bait, and fish inside a vehicle. Vehicle rack options are available such as cargo boxes for carrying fishing gear. Existing cargo boxes isolate fishing gear from the vehicle's passenger compartment, and protect the fishing gear from the external environment. However, there is a need for improvements relating to a desire to better organize and protect fishing equipment inside a cargo box. For example, many fishing rods are expensive high-performance tools that may be damaged if loaded loosely into a cargo box along with other loose miscellaneous items. It is often desirable to place a pre-rigged fishing rod in a cargo box, and be able to unload the rod ready for use at a destination. Also, many conventional cargo boxes are excessively big and bulky for carrying fishing gear, resulting in less aerodynamic, and economic performance.

SUMMARY

A carrier box for securely carrying fishing rods and related cargo on top of a vehicle is disclosed, including a top portion hingedly connected to a bottom portion. The bottom portion includes a plurality of rod holder assemblies to support and securely hold a plurality of fishing rods and reels, during transport between locations. The rod holder assemblies are configured to be repositionable to accommodate various lengths of fishing rods.

The carrier box may be configured to securely carry a load in transit, and may have the bottom portion configured to extend perpendicular to a crossbar. The carrier box may further include a clamp assembly configured to connect the carrier box to a crossbar on top of a vehicle. The clamp assembly may be connected through a slot in the bottom portion. The clamp device may be adjustable along a length of the bottom portion.

In some examples, the rod holder assemblies may include a pad defining plural concave fishing rod support surfaces, and an elastomeric retention device configured to extend over rods held on the support surfaces.

In some examples, the carrier box includes a cargo space above and beneath the rod holder assemblies for storing additional accessories like small tackle boxes, unstrung rods, other fishing gear, or any other cargo.

DETAILED DESCRIPTION

This disclosure provides numerous selected examples of invented devices for transporting fishing related gear in a carrier box on the rooftop of a vehicle. Many alternatives and modifications which may or may not be expressly mentioned, are enabled, implied, currently possessed, and are supported by the disclosure.

Figure 1:
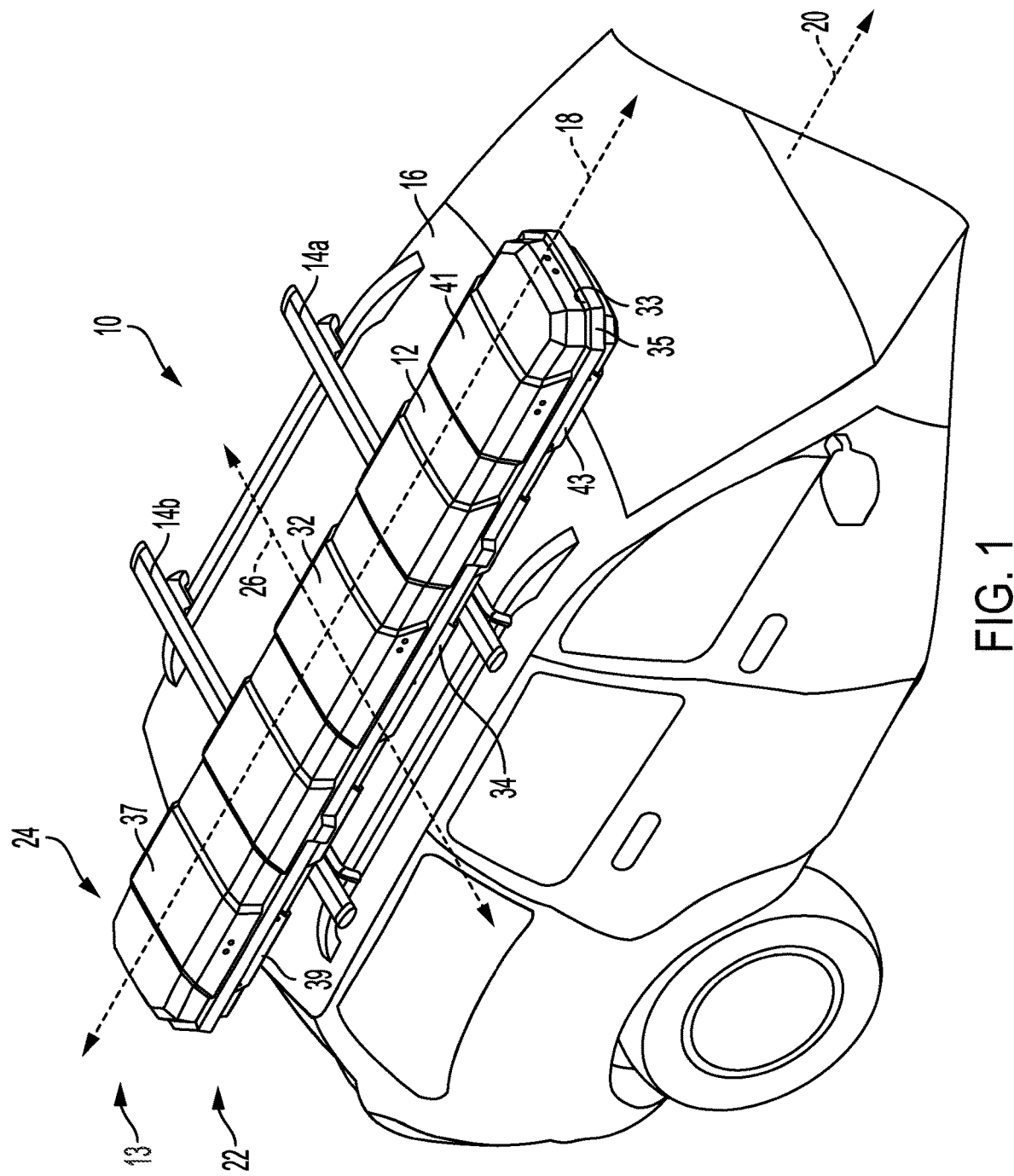
FIG. 1 is an isometric view of a fishing gear carrier box according to aspects of the present disclosure, secured to the rooftop of a vehicle.

As shown in FIG. 1, a rooftop fishing gear carrier system 10, as disclosed herein, includes a carrier box 12, mountable to front and rear crossbars 14a, 14b on the rooftop of a vehicle 16 and configured to securely carry fishing related cargo in transit. The box may be mounted such that a long axis or longitudinal axis 18 of the box is at least parallel to a direction of travel 20 of the vehicle and transverse to the crossbars. Carrier box 12 includes a first lateral side 22 and an opposing second lateral side 24. Typically, the first and second lateral sides are parallel to one another, and to the direction of travel of vehicle 18. In an example, the carrier box may be at least five times longer along the longitudinal axis, than along the transverse axis.

In the present example as shown in FIG. 1, the carrier box is illustrated in a closed position 13, and is mounted on the cross bars proximate to passenger's side of the vehicle. Further, carrier box 12 may be openable on first lateral side 22, for ease in gaining access into the interior of the carrier box. In other examples, carrier box 12 may be turned around and mounted on cross bars 14a, 14b, proximate to driver's side of the vehicle. Such that first lateral side 22 is aligned towards the driver's side of the vehicle for gaining access into the interior of the box from the driver's side. In other words, carrier box 12 is symmetrical about a transverse axis 26 of the carrier box. Alternatively, the carrier box can be mounted on the cross bars at any point between the passenger's and driver's sides of vehicle 16. In any example, the box may be mounted, such that a load of the carrier box is supported and equally distributed across the pair of crossbars 14a, 14b.

The carrier box 12 includes a top portion or lid or cover 32 hingedly connected to a bottom portion or base 34 on the second lateral side. The top portion may be provided with an extended or overhanging belt line 33, which fits over the bottom portion, to form a smooth midline 35 around carrier box 12. Overhanging beltline 33 may facilitate water drainage off the box, thereby avoiding any leakage into the interiors of the carrier box. In a preferred example, an exterior surface 37, 39 of the top and bottom portions may have a scratch resistant finish and may include embossed transverse ribs or indentations 41, 43. The transverse ribs may provide anti-torsional stability to the carrier box and may also be desirable aesthetically.

Figure 2A:
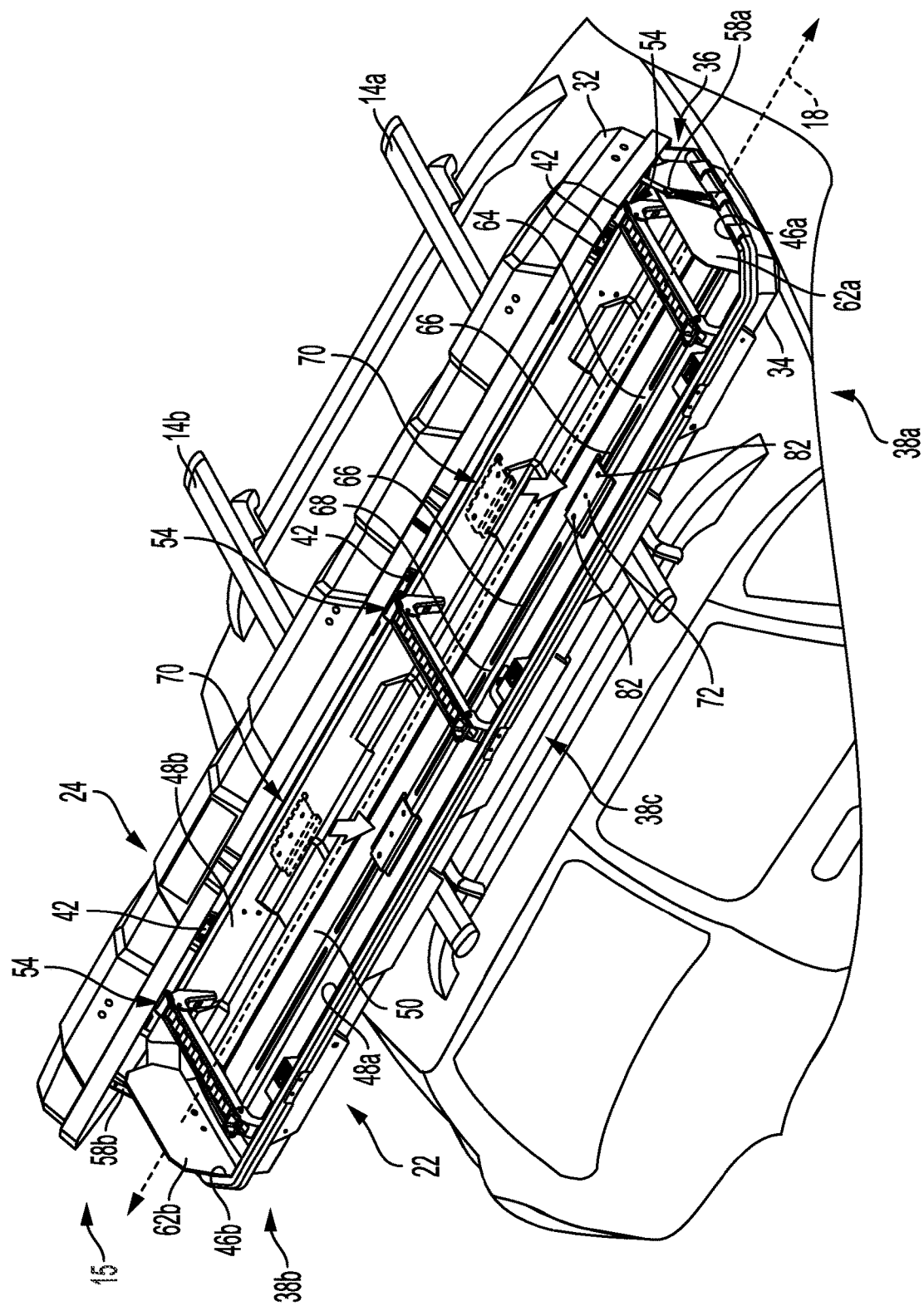
FIG. 2A is an isometric view of the box of FIG. 1, in an open position and clamped to a pair of crossbars.

Carrier box or box 12, is shown in more detail in FIG. 2A, in an open position 15. Top portion 32 may be connected to bottom portion 34 by a hinged connection 36. In the present example the box is openable on first lateral side 22 and the hinged connection extends along second lateral side 24. The hinged connection extends from a front portion 38a to a rear portion 38b of the box through a middle portion 38c of the box along second lateral side 24. In such an example, each of the front, middle and rear portions may include a hinge mount or hinge device 42 on the second lateral side to connect the respective top and bottom portions.

The bottom portion includes a front wall 46a in the front portion, and a rear wall 46b in the rear portion of the box. Further, first and second side walls 48a, 48b and a floor 50 extend from front portion 38a to rear portion 38b along the longitudinal axis of carrier box 12. As will be described in greater detail later, and as shown in FIG. 2A, the bottom portion includes a plurality of rod holder assemblies 54 connected between first and second side walls 48a, 48b, transverse to longitudinal axis 18 of the carrier box. Additionally, the bottom portion includes a pair of strut members 58a, 58b and rod shields 62a, 62b, both connected at least to front and rear walls 48a, 48b of the carrier box.

Figure 2C:
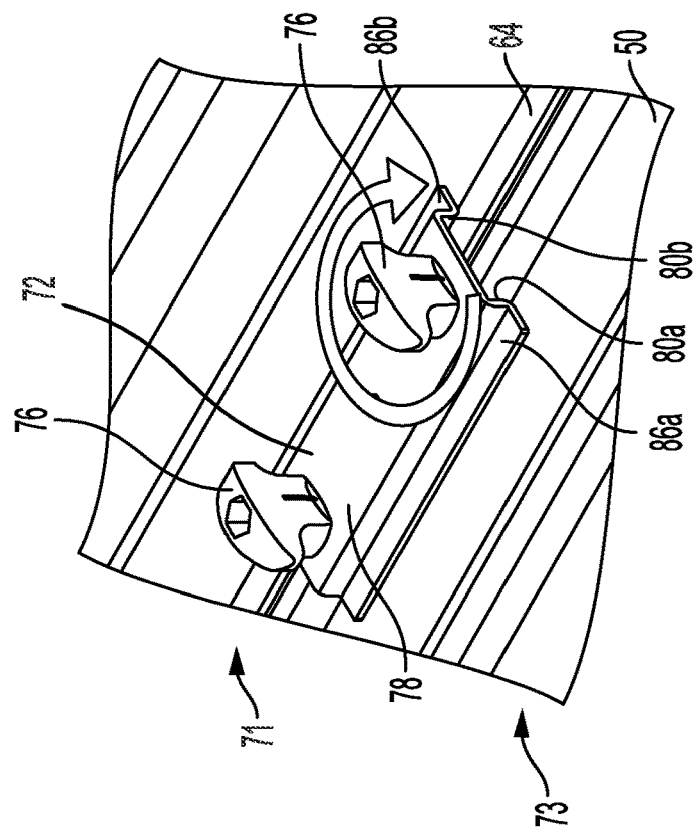
FIG. 2C is an isometric view of a clamp plate with fastening actuators for clamping a box to a crossbar.
Figure 2B:
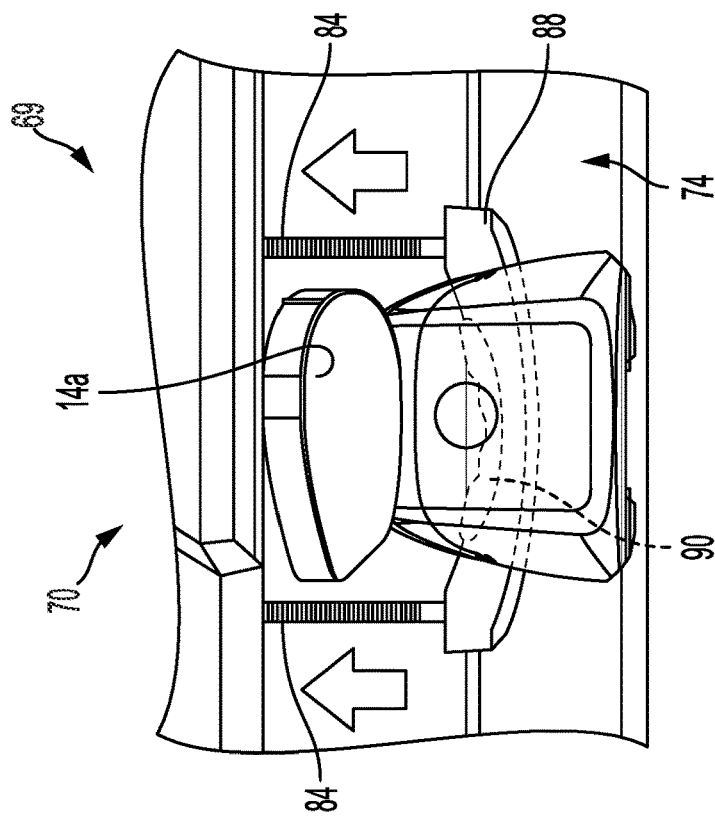
FIG. 2B is a front view of a crossbar clamp.

Referring to FIGS. 2A-2C, in the present example, carrier box 12 includes a pair of clamp assemblies 70, and each clamp assembly includes a clamp plate 72, a clamp 74 and a pair of clamp plate fasteners 76, configured to mount the carrier box to vehicle crossbar 14a or 14b, as explained in more detail below. Clamp assembly 70 may also be described as mounting the carrier box on the cross bars through floor 50 of bottom portion 34. Preferably, each of the clamp assembly may be mounted symmetrically spaced about the transverse axis.

Generally, clamp plate 72 has a non-flat structure or a stepped channel cross section or a hat shaped structure 73. The clamp plate includes a central raised section 78 and substantially parallel first and second side sections 80a, 80b extending from opposing side portions of the central raised section. The central raised section includes at least a pair of clamp plate apertures 82 for receiving threaded shafts 84 of clamp 74.

Clamp plate 72 further includes first flange 86a extending from first side section 80a, and second flange 86b extending from second side section 80b. First and second flanges 86a, 86b extend away from each other in opposing directions and may be parallel to central raised section 78. Each clamp plate 72 is received on slot 66 or adjacent slots 66 in rail or ridge 64, such that central raised section 78 and side sections 80a, 80b are received on rail 64 and side flanges 86a, 86b extend away from the rail. Rail 64 is shaped to compliment the shape of the clamp plate and to aid in seating of clamp plate 72 against floor 50, when the clamp is in its locked position thereby providing repeatable and secure alignment.

As seen in FIG. 2A the bottom portion includes rail 64, which is raised or elevated relative to floor 50, and extends along the longitudinal axis between front and rear portions 46a, 46b of the carrier box. The rail includes a plurality of spaced apart linear slots 66 extending along the length of the rail. The slots are spaced apart by inter-slot spacings 68. The slots are configured for receiving clamp assemblies 70 for easily securing the carrier box on to crossbars 14a, 14b, with just one clamp assembly per crossbar. In the present example, the rail includes six linear slots, separated by five inter-slot spacings and the slots are longer than the inter-slot spacings. In other examples a higher (seven and more) or lesser (four or less) number of slots may be separated by inter-slot spacings or the slots may be shorter than the inter-slot spacings.

As shown in FIG. 2B, clamp assemblies 70 includes a U bolt-type clamp. Other clamp devices may also be used, for example, similar to the clamps described in U.S. Pat. No. 7,416,098, listed in the Cross-Reference section above. Clamp assembly 70 is configured to secure carrier box 12 to the crossbars of the vehicle in its locked position 71. Because such crossbars are not uniformly sized, shaped, or spaced on all vehicles, the crossbar clamp is adjustable in its unlocked position 69, both in terms of longitudinal placement on the carrier box and in terms of the clamping mechanism used to mount onto the crossbars.

A crossbar clamp or U-bolt clamp 74 includes a bail member 88. A padded member 90 may be attached to an inner side of bail member 88 for receiving crossbar 14a or 14b. Threaded bolts or shafts 84 extend from opposing ends of bail member 88, and extend through slots 66 and floor 50 of bottom portion 34, and through clamp plate apertures 82 of the clamp plate, and are engaged by a pair of clamp plate fasteners 76, inside the carrier box 12. As shown in FIG. 2C, first and second flanges 86a, 86b have respective bottom surfaces, as viewed in the figure, that are configured to seat onto floor of bottom portion 34, so that clamp plate 72 reinforces, and distributes the load of the carrier box on the cross bars uniformly, when the clamp is in a locked position 71.

To clamp the carrier box to a crossbar, a user may position clamp plate 72 on rail 64 at a desired position and insert the U-bolt clamp 74 at a position below crossbar 14a, contacting the padded member 90 of the U-bolt clamp with the crossbar. U bolt clamp 74 may be pushed upwards through the floor such that the threaded shafts are received inside the floor of the bottom portion. Then, the user may thread pair of clamp plate fasteners 76, rotating the clamp plate fasteners to tighten the clamp against the crossbar, securing the clamp assembly to the crossbar in a locked position 71 of the clamp.

Each clamp assembly 70 may be adjustable to grip, with variable force, crossbars of different dimensions. Each of the clamp assemblies may also be adjustable to different locations in each of slots 66 on the floor of the box, for example, along an axis parallel to a direction of vehicle travel 20. For example, each of the clamp assemblies may be mounted in a single slot 66 on railing 64. In other examples each of the clamp assemblies may be mounted across adjacent slots 66, to include the inter-slot spacing 68 for better stability of the clamp assembly.

Plurality of slots 66 along the rail in bottom portion 34 also provides for aeration and drainage of any water from the fishing related cargo in the carrier box. Alternatively, the slots may be covered with multiple segments of infill members, precisely cut to match the size of the open slots, to have a completely enclosed environment inside carrier box 12 in closed position 13.

The spacing between clamp assemblies 70 may be adjusted to correspond to a spacing between vehicle crossbars 14a, 14b. In some examples, additional or alternative mounting hardware may be included. For example, removable or integrated T-track connectors may be included in the carrier box. The clamp assemblies are preferably configured, so that once the clamp assemblies are adjusted for a particular vehicle configuration, carrier box 12 can be easily installed or removed by simply manipulating the clamp assembly.

Figure 3:
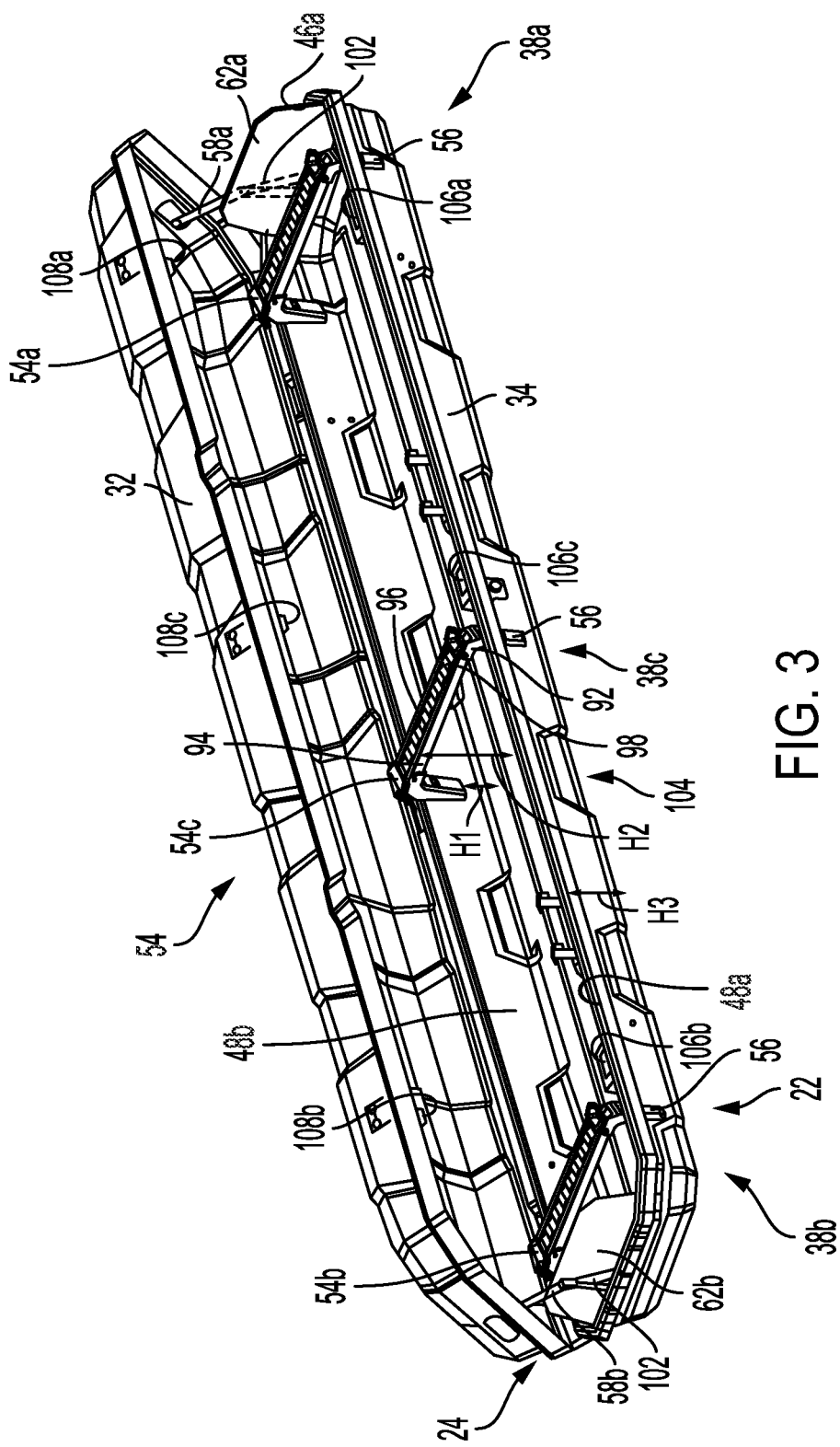
FIG. 3 is an isometric view of the box of FIG. 1, in an open position with rod holder assemblies.

FIG. 3 shows carrier box 12 including a plurality of rod holder assemblies 54 mounted in bottom portion 34 of the carrier box, and configured to hold a plurality of fishing rods. In the present example the carrier box has three rod holder assemblies 54a, 54b, 54c, spaced away from each other along the longitudinal axis, and mounted in front, rear, and middle portions 38a, 38b, 38c of the carrier box, respectively. All three rod holder assemblies are mounted parallel to each other and are transverse to longitudinal axis 18 of the carrier box.

The rod holder assemblies may also be described as bridging or spanning between side walls 48a, 48b of the carrier box, orthogonal to the side walls. The rod holder assemblies are mounted at a same height H1 above the floor of the bottom portion to facilitate holding of the plurality of fishing rods nearly parallel to the longitudinal axis. In an example, the plurality of rod holder assemblies may be held above a virtual plane topping the bottom portion and including the longitudinal axis. An overall height H2 of rod holder assemblies 54a-c may also be greater than a height H3 of the bottom portion 34 of the carrier box.

Each of the rod holder assemblies may be configured to be easily mounted to a pair of sidewall apertures 55 (not shown) in laterally opposite side walls 48a, 48b by engaging with a pair of sidewall fasteners 56. Each of the front and rear portions of carrier box 12 may include plurality of pairs of sidewall apertures corresponding to different mounting positions for the rod holder assemblies. Similarly, the rod holder assembly may be configured to be easily removable from the carrier box, by disengaging the pair of sidewall fasteners 56.

Figure 4:
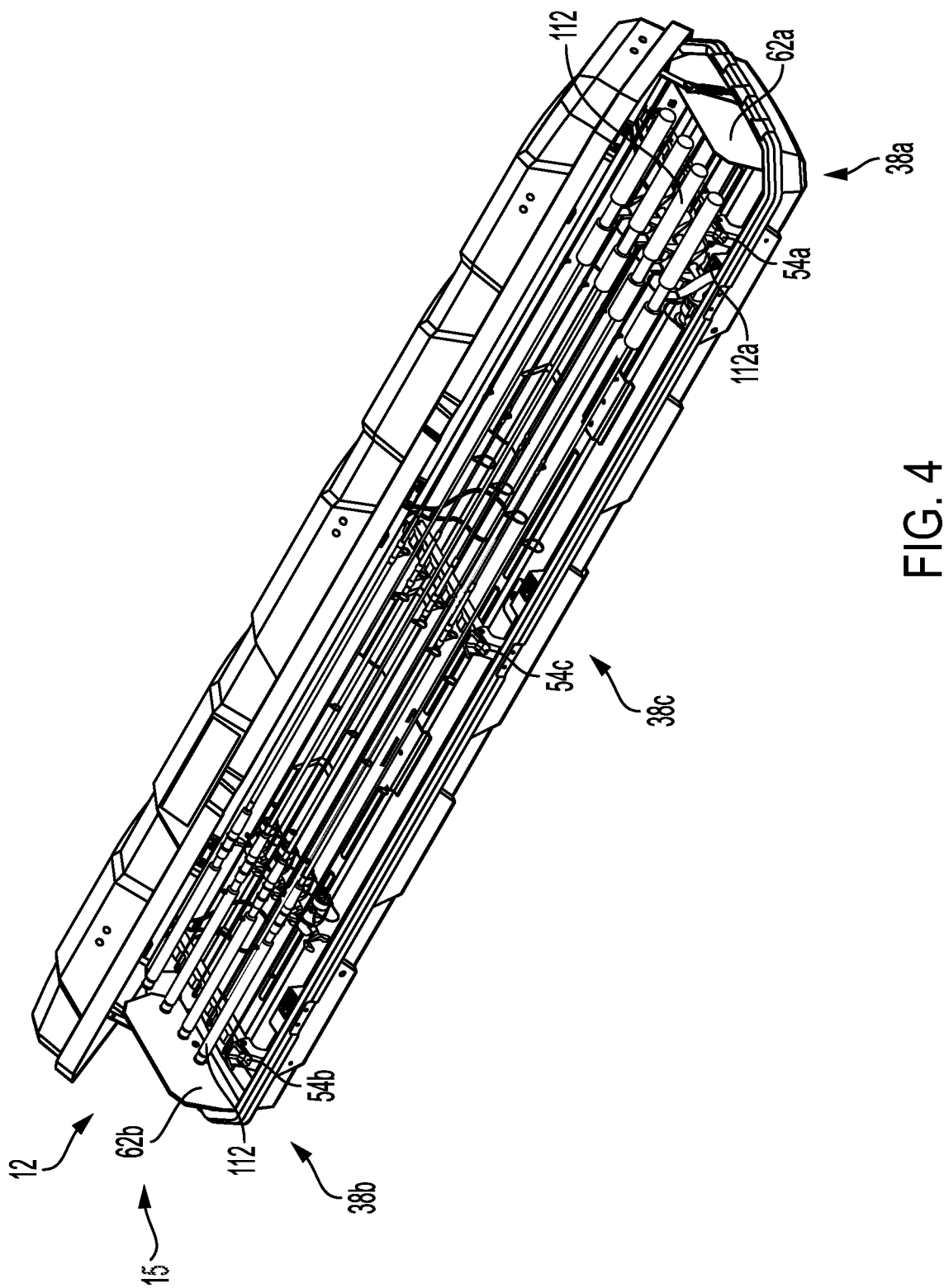
FIG. 4 is an isometric view of the box of FIG. 1, with the rod holder assemblies holding fishing rods.

As will be described in greater detail later, and as shown in FIGS. 3 and 4, each of the rod holder assemblies includes a pair of side support members 92 to connect with opposing side walls, and configured to couple to a crossbeam 94 extending transverse to the longitudinal axis of the carrier box. Further, the crossbeam includes a padded surface 96 including a plurality of concave surfaces 98 to facilitate placement of a plurality of fishing rods. Concave surfaces 98, which may also be described as an array of longitudinal ridges or regularly spaced protrusions, which may be shaped to accommodate a plurality of fishing rods.

Strut members 58a, 58b are coupled at the front and rear portions of box 12, connecting top portion 32 to bottom portion 34. Strut members 58a, 58b stabilize the top portion, when moving between open and closed positions of the carrier box. Strut members 58a, 58b may also limit the extent of potential opening of carrier box 12. For example, strut members 58a, 58b, may limit the extent of opening on the first lateral side of box 12 to approximately 10-inches. For example, strut member 58a may have one end pivotally connected to inner front wall or front wall 46a of bottom portion 34, by a first end of a connector 99 (not shown). Another end of the strut member may be pivotally fastened to top portion 32, and an over-center spring 102 may be configured to assist with opening and/or closing of top portion 32, and preferably exerts an opening force on top portion 32 when the top portion is fully opened.

Also shown in FIG. 3 is a pair of rod shields or end plates 62a, 62b. The rod shields are configured to connect to the front and rear walls of the bottom portion at a second end of connector 99 (not shown). The rod shields 62a, 62b are preferably stiff and rigid (ABS plastic, for example). Rod shields 62a, 62b may be used to protect the fishing rods from damage during use, for example, avoiding closing the lid on a rod that overextends the shell of the carrier. In some examples, rod shield surfaces facing the fishing rods may be attached with a padded foam material for a better effective protection of fishing rod ends during transit.

FIG. 3 shows details of an exemplary latch system 104 for use on carrier box 12. Bottom portion 24 may include three latch retention devices, 106a, 106b, 106c secured to the wall of the box. Latch retention devices 106a, 106b, 106c may be joined for cooperative locking and unlocking purposes via common bar 110 (not shown). Latches 108a, 108b, 108c are typically fastened to an inner surface of top portion 32. Latches 108a, 108b, 108c simultaneously lock and engage latch retention devices 106a, 106b, 106c, respectfully. In a preferred example latch retention device 106a. 106b, 106c, may include a key operated lock mechanism.

FIG. 4 shows carrier box 12 in open position 15 with a plurality of fishing rods 112 secured by rod holding assemblies 54a, 54b, 54c. It may be noted that the fishing rods may be organized in alternating directions in order to maximize carrying capacity by allowing space on each end to accommodate fishing reels 112a on every other rod. Rod shields 62a, 62b at front and rear portions 38a, 38b provide protection to ends of fishing rods 112 during opening and closing of carrier box 12.

As shown in FIGS. 3 and 4, rod holder assemblies 54a, 54b, 54c are substantially identical, each rod holder assembly being a mirror image of each other. Accordingly, rod holder assembly 54b in rear portion 38b of the carrier box will be described below in detail. A similar description follows for other rod holder assemblies with differences mentioned as needed.

Figure 5B:
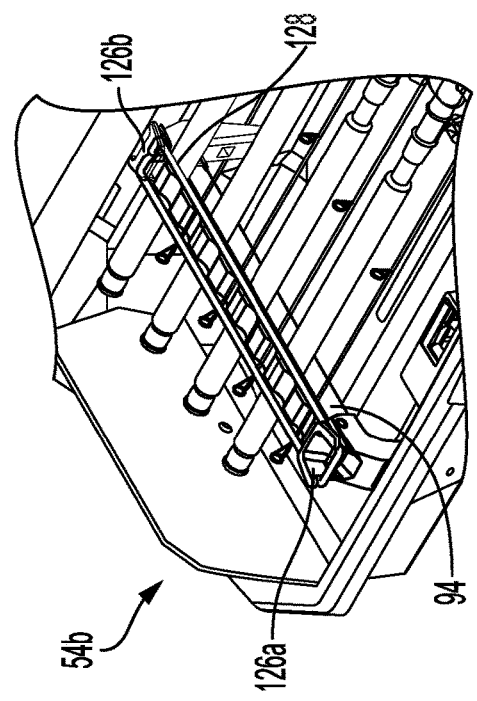
FIG. 5B is an isometric view of the rod holder assembly of FIG. 5A, with fishing rods
Figure 5C:
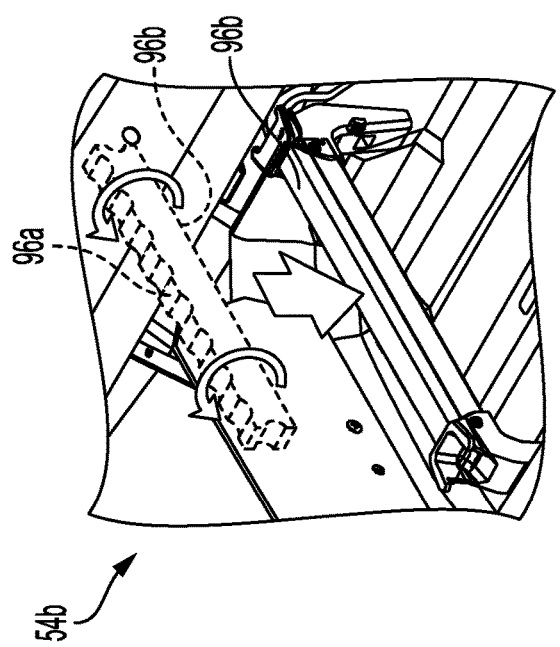
FIG. 5C is an isometric view of the rod holder assembly of FIG. 5A, with an invertible pad.
Figure 5A:
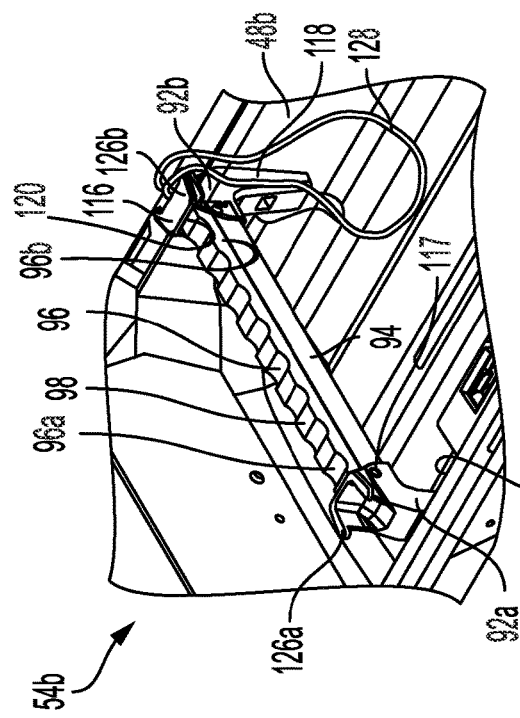
FIG. 5A is an isometric view of a rod holder assembly.

As shown in FIG. 5A, rod holder assembly 54b includes a pair of side support members or brackets 92a and 92b which are bolted, and/or fastened to first and second side walls 48a, 48b of the carrier box. Each of side support members 92a, 92b is of unitary construction and includes a head piece 116 and a tail piece 118. The head piece includes a recessed slot 120 shaped to receive the crossbeam 94 of a matching cross section. In the present example the crossbeam 94 has a square cross section, and hence the recessed slot may have a square shape. In other words, the tail pieces of side support members 92a, 92b are fastened to opposite side walls 48a, 48b. Recessed slots 120 in head pieces 116 may face each other and are configured to receive crossbeam 94 across the interior space of the carrier box, transverse to longitudinal axis 18. Each of the head piece may include a pair of head piece apertures 115 (not shown) for receiving head piece fasteners 117. The cross beam may include matching crossbeam apertures 119 (not shown) at both terminal ends to facilitate coupling to the head piece. The cross beam may be connected to the head pieces, by aligning head piece apertures 115 with crossbeam apertures 119 in the recessed slots of the head piece, and by fastening with a pair of head piece fasteners 117.

Padded rod holder or foam pad 96 includes an upper surface 96a and an opposite lower surface 96b. Upper surface 96a includes a plurality of concave surfaces 98 and lower surface 96b includes a flat planar structure. The lower surface of the padded rod holder is mounted on a top side 94a (not shown) of crossbeam 94, to provide the upper surface 96a including a plurality of concave rod holding surfaces 98 for securely and safely holding fishing rods 112 in the carrier box during transport.

Referring to FIGS. 5A and 5B, each side support member 92a, 92b includes an upper retention post or rim 126a, 126b, respectively. Side support member 92b, which is attached to second side wall 48b has its upper retention post 126b configured for adhesive attachment to elastomeric band or O-ring band 128. Likewise, side support member 92a, which is attached to first side wall 48*a* has its upper retention post 126*a* configured for receiving elastomeric band 128 stretched from the opposite upper retention post 126*b*. Elastomeric band 128 may be stretched between retention posts 126*a*, 126*b* to extend over tops of fishing rods supported by padded rod holder 96 for engaging and retaining fishing rods in the rod holder assemblies 54*b* during transport.

As shown in FIG. 5C, padded rod holder 96 may be flipped or inverted upside-down, and upper surface 96*a* of the padded rod holder may be mounted on a top side 94*a* of crossbeam 94, to provide lower surface 96*b* including a flat planar rod holding surface for securing a greater number of fishing rods 112 in the carrier box during transport.

Referring back to FIG. 4, the combination of the three rod holder assemblies may securely support and hold at least eight fishing rods in carrier box 12. Firstly, the elastomeric band of rod holder assembly 54*a* at the front portion of the carrier box may extend over a first set of four handles of fishing rods held in padded surfaces of rod holder assembly 54*a*. Secondly, the elastomeric band of rod holder assembly 54*b* at the rear portion of the carrier box may extend over the other set of four handles of fishing rods arranged in an alternating manner relative to the first set, and held in padded surfaces of rod holder assembly 54*b*. Lastly, the elastomeric band of rod holder assembly 54*c* at the middle portion of the carrier box may extend over mid parts of all the eight fishing rods held in padded surfaces of rod holder assembly 54*c*.

Figure 6:
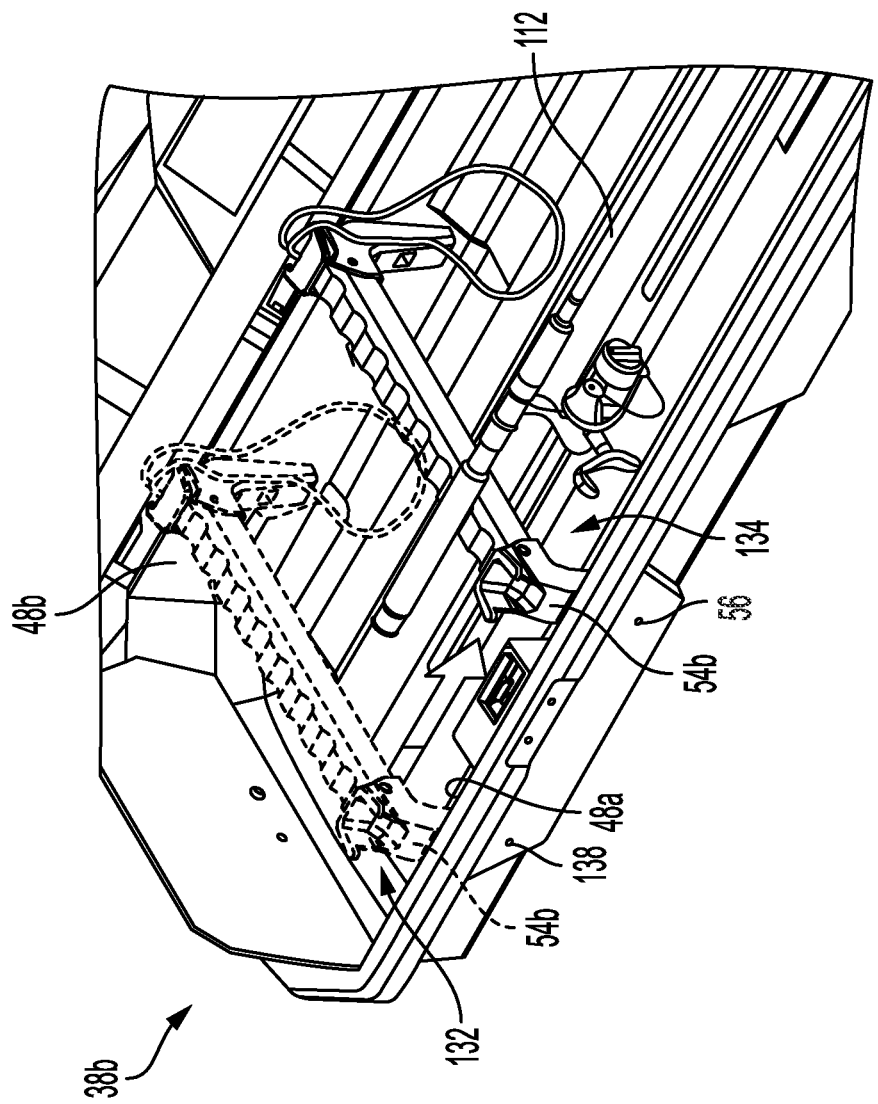
FIG. 6 is a partial isometric view of the box of FIG. 1, showing repositioning of rod holder assemblies.

In front and rear portions of the carrier box, rod holder assemblies 54*b* may be repositionable along the longitudinal axis. A repositioning of the rod holder assemblies may facilitate accommodation of varied length of fishing rods 112. For example, as shown in FIG. 6, to accommodate a shorter fishing rod 112, rod holder assembly 54*b* in rear portion 38*b* may be repositioned from a first mounting position 132 to a second mounting position 134, towards the middle portion along the longitudinal axis. Alternatively, to accommodate longer fishing rods, rod holder assemblies in the front and rear portions may be positioned away from the middle portion along the longitudinal axis.

In an example, each of front and rear portions 38*a*, 38*b* may have two pairs of side wall apertures 55, 57 (not shown), configured to mount a rod holder assembly corresponding to first and second mounting positions 132, 134. For example, a first pair of sidewall apertures 55 in first and second side walls 48*a*, 48*b*, towards the rear wall, may correspond to first mounting position 132, and likewise a second pair of sidewall apertures 57 in the first and second side wall, away from the rear wall, may correspond to second mounting position 134 for the rod holder assembly. Preferably, when first pair of sidewall apertures 55 are used for mounting the rod holder assembly, second pair of sidewall apertures 57 may be selectively covered by cap buttons 138 and vice versa.

To reposition the rod holder assembly, first, the user may disengage the side wall fasteners 56 of the rod holder assembly at first mounting position 132 and remove the rod holder assembly 54*a*. Second, the user may remove cap buttons 138 from the sidewall apertures at the second mounting position. Third, the user may engage the sidewall fasteners 56 at second mounting position 134 to securely mount the rod holder assembly at the second mounting position 134. And lastly, the user may cover the first pair of sidewall apertures at the first mounting position with cap buttons 138.

Figure 7:
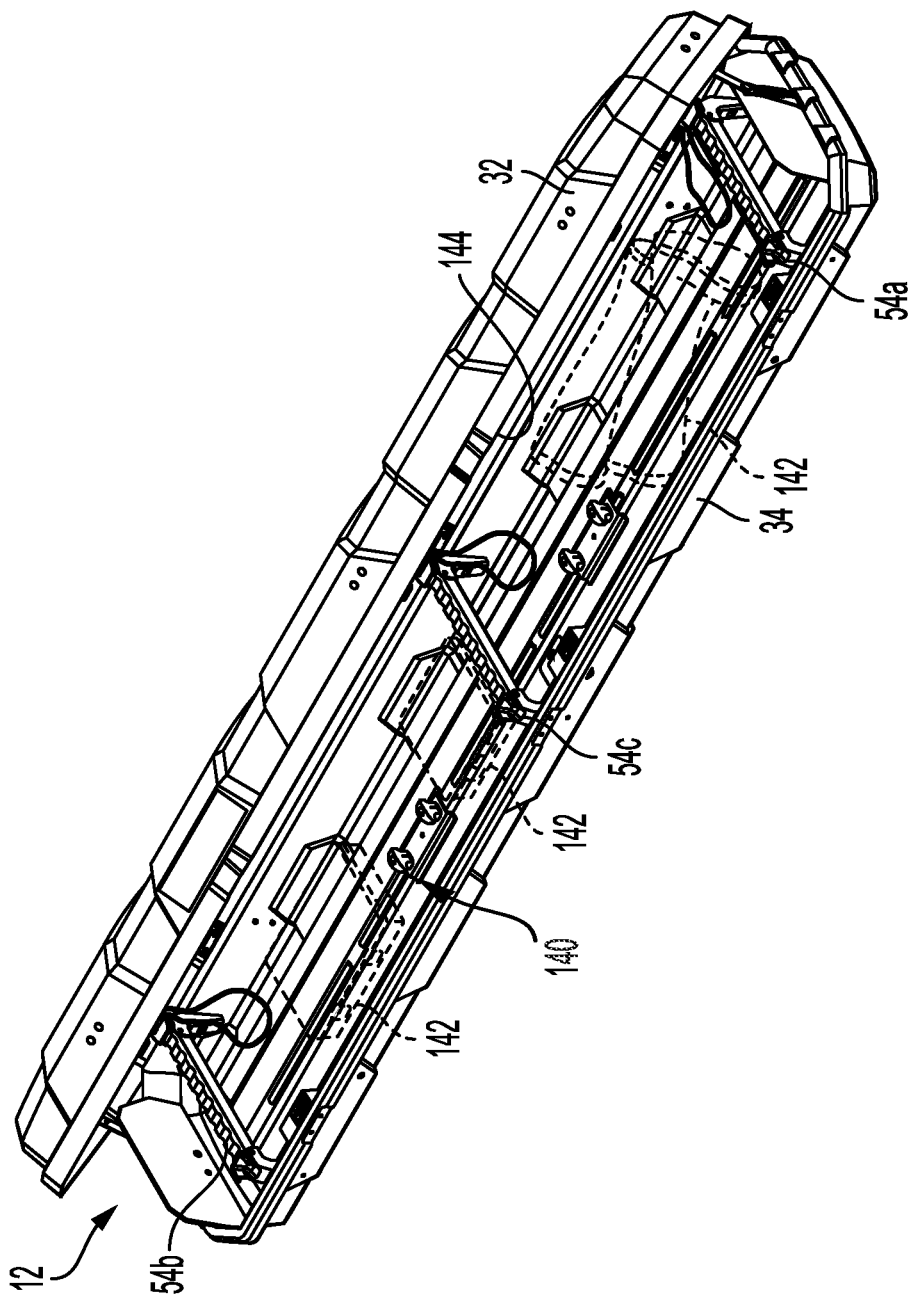
FIG. 7 is an isometric view of the box of FIG. 1, showing cargo stored in a space beneath the rod holder assemblies.

Referring to FIG. 7, carrier box 12 includes a storage space 140 in the bottom portion of the box, beneath the rod holder assemblies 54*a*, 54*b*, 54*c*. Storage space 140 may be used to store fishing accessories 142 including sinkers, lure, tackles boxes, fishing boots, fishing nets and lures. Optionally rod holder assemblies 54*a*, 54*b*, 54*c* may be completely removed, and the carrier box may be used for storing bigger accessories. In a closed position of the box, the top portion provides additional storage space, as a ceiling 144 of the top portion is spaced away from the rod holder assemblies 54*a*, 54*b*, 54*c*.

Additional Examples and Illustrative Combinations

This section describes additional aspects and features of cargo carrier systems according to the present teachings, and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A vehicle rooftop carrier, comprising:
a box including:
a clamp assembly for fastening the box to a crossbar on top of a vehicle,
a bottom portion having a floor,
a lid fastened to the bottom portion via a hinge device, and
a plurality of rod holder assemblies mounted inside the box transverse to a long axis of the box, each rod holder assembly being spaced above the floor and including a fishing rod support surface, and an elastomeric retention device configured to extend over rods held on the support surface.

A1. The carrier of claim A, wherein the floor of the bottom portion includes a rail along the long axis of the box, having a plurality of spaced apart slots.

A2. The carrier of claim A1, wherein the clamp assembly is slidably mounted to the bottom portion of the box through one of the slots.

A3. The carrier of claim A1, wherein the clamp assembly includes a clamp plate configured to slide on the rail.

A4. The carrier of claim A, wherein each of the rod holder assembly includes a pair of side supports fastened to opposite wall portions of the bottom portion, and a crossbeam connected to the side supports.

A5. The carrier of claim A4, wherein each of the side supports includes an upper retention post.

A6. The carrier of claim A4, wherein the elastomeric retention device is connected to one of the side supports.

A7. The carrier of claim A6, wherein the elastomeric retention device is configured to stretch between a pair of upper retention posts.

A8. The carrier of claim A, wherein each rod holder assembly has a pad removably attached to a top surface of a cross beam.

A9. The carrier of claim A8, wherein the pad is configured to be flipped upside down and reattachable to the top surface of the cross beam.

A10. The carrier of claim A, wherein the rod holder assembly is movable from a first position to a second position along the long axis of the box.

A11. The carrier of claim A, further including a strut member positioned interior to the box, and pivotally connecting the lid to the bottom portion of the box.

A12. The carrier of claim A11, wherein the strut member is spring biased to assist in opening or closing of the lid relative to the bottom portion.

A13. The carrier of claim A, wherein the lid includes a ceiling, which is spaced away from the rod holder assemblies in a closed position of the box.

A14. The carrier of claim A12, wherein the bottom portion of the box includes a rod shield member proximate to the strut member.

A15. The carrier of claim A, wherein the lid includes an overhanging beltline that fits over the bottom portion and forming a smooth midline around the box.

A16. The carrier of claim A, wherein the lid includes a plurality of raised transverse ribs on an outside surface.

B. A vehicle rooftop carrier, comprising:
a box including:
a lid having a ceiling,
a bottom portion having a floor, the lid and the bottom portion being connected via a hinge device,
a plurality of rod holder assemblies removably mounted inside the box transverse to a long axis of the box, each rod holder assembly being spaced above the floor,
a pair of clamp devices mounted to the floor configured to secure the box to a pair of crossbars on top of a vehicle,
wherein each clamp device includes a clamp plate and a clamp configured to receive a crossbar, and movable in a slot of a rail in the floor, and a corresponding tightening mechanism causing a transition between a locked and an unlocked position of the box relative to a crossbar.

B1. The carrier of claim B, wherein each rod holder assembly includes a pad defining plural concave fishing rod support surfaces, and an elastomeric retention device configured to go over rods held on the support surfaces.

C. A vehicle rooftop fishing gear carrier, comprising:
a box including opposing lateral sides, a lid, a bottom portion, a front end, and a rear end, the lid having a ceiling, the bottom portion having a floor, the lid and the bottom being connected via a hinge device at a first lateral sides,
strut members connecting the lid to the bottom portion on the front and rear end of the box to assist in holding the box open,
a plurality of rod holder assemblies mounted inside the box transverse to a long axis of the box, each rod holder assembly being spaced above the floor and including a pad defining plural concave fishing rod support surfaces, and an elastomeric retention device configured go over rods held on the support surfaces,
a pair of clamp devices mounted to the floor configured to secure the box to a pair of crossbars on top of a vehicle, and
the box openable and closable at a second lateral side, opposite to the first lateral side.

D. A vehicle rooftop carrier, comprising:
a box including opposing lateral sides, a lid, a bottom portion, a front end, and a rear end, the lid having a ceiling, and the bottom portion having a floor, extending along a longitudinal axis of the box,
a pair of clamp devices mounted to the floor configured to secure the box to a pair of crossbars on top of a vehicle, and
a plurality of rod holder assemblies mounted inside the box transverse to a long axis of the box, each rod holder assembly being spaced above the floor and including a pad defining plural concave fishing rod support surfaces, and an elastomeric retention device configured go over rods held on the support surfaces, wherein at least a rod holder assembly is configured to be repositionable between a first and a second position along the longitudinal axis of the box.

D1. The carrier of claim D, wherein at least one rod holder assembly is configured to be repositionable between a first and a second position along the long axis of the box.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A vehicle rooftop carrier, comprising:
a box including:
a clamp assembly for fastening the box to a crossbar on top of a vehicle,
a bottom portion having a floor,
a lid fastened to the bottom portion via a hinge device, and
a plurality of rod holder assemblies mounted inside the box transverse to a long axis of the box, connected between a first side wall and a second side wall of the bottom portion, each rod holder assembly being spaced above the floor and including a fishing rod support surface, and an elastomeric retention device configured to extend over rods held on the support surface.

2. The carrier of claim 1, wherein the floor of the bottom portion includes a rail along the long axis of the box, having a plurality of spaced apart slots.

3. The carrier of claim 2, wherein the clamp assembly is slidably mounted to the bottom portion of the box through one of the slots.

4. The carrier of claim 2, wherein the clamp assembly includes a clamp plate configured to slide on the rail.

5. The carrier of claim 1, wherein each of the rod holder assembly includes a pair of side supports fastened to the first and second side wall portions of the bottom portion, and a crossbeam connected to the side supports.

6. The carrier of claim 5, wherein each of the side supports includes an upper retention post.

7. The carrier of claim 5, wherein the elastomeric retention device is connected to one of the side supports.

8. The carrier of claim 7, wherein the elastomeric retention device is configured to stretch between a pair of upper retention posts.

9. The carrier of claim 1, wherein each rod holder assembly has a pad removably attached to a top surface of a cross beam.

10. The carrier of claim 9, wherein the pad is configured to be flipped upside down and reattachable to the top surface of the cross beam.

11. The carrier of claim 1, wherein the rod holder assembly is movable from a first position to a second position along the long axis of the box.

12. The carrier of claim 1, further including a strut member positioned interior to the box, and pivotally connecting the lid to the bottom portion of the box.

13. The carrier of claim 12, wherein the strut member is spring biased to assist in opening or closing of the lid relative to the bottom portion.

14. The carrier of claim 12, wherein the bottom portion of the box includes a rod shield member proximate to the strut member.

15. The carrier of claim 1, wherein the lid includes a ceiling, which is spaced away from the rod holder assemblies in a closed position of the box.

16. The carrier of claim 1, wherein the lid includes an overhanging beltline that fits over the bottom portion and forming a smooth midline around the box.

17. A vehicle rooftop carrier, comprising:
a box including:
 a lid having a ceiling,
 a bottom portion having a floor, the lid and the bottom portion being connected via a hinge device,
 a plurality of rod holder assemblies removably mounted inside the box, including a crossbeam transverse to a long axis of the box, each rod holder assembly being spaced above the floor,
 a pair of clamp devices mounted to the floor configured to secure the box to a pair of crossbars on top of a vehicle,
 wherein each clamp device includes a clamp plate and a clamp configured to receive a crossbar, and movable in a slot of a rail in the floor, and a corresponding tightening mechanism causing a transition between a locked and an unlocked position of the box relative to a crossbar.

18. The carrier of claim 17, wherein each rod holder assembly includes a pad defining plural concave fishing rod support surfaces, and an elastomeric retention device configured to go over rods held on the support surfaces.

19. A vehicle rooftop fishing gear carrier, comprising:
a box including opposing lateral sides, a lid, a bottom portion, a front end, and a rear end, the lid having a ceiling, the bottom portion having a floor, the lid and the bottom being connected via a hinge device at a first lateral sides,
strut members connecting the lid to the bottom portion on the front and rear end of the box to assist in holding the box open,
a plurality of rod holder assemblies mounted inside the box transverse to a long axis of the box, each rod holder assembly being spaced above the floor and including a fishing rod support surface, and an elastomeric retention device configured to go over portions of rods held on the support surface,
a pair of clamp devices mounted to the floor configured to secure the box to a pair of crossbars on top of a vehicle, and
the box openable and closable at a second lateral side, opposite to the first lateral side.

20. The carrier of claim 19, wherein at least one rod holder assembly is configured to be repositionable between a first and a second position along the long axis of the box.

* * * * *